United States Patent [19]

Tajima et al.

[11] Patent Number: 5,268,220
[45] Date of Patent: Dec. 7, 1993

[54] POLYPROPYLENE FILM

[75] Inventors: Minoru Tajima, Yokohama; Koichi Fujii, Yokosuka; Noboru Yamaoka, Yokohama, all of Japan

[73] Assignee: Nippon Petrochemicals Company, Limited, Tokyo, Japan

[21] Appl. No.: 845,007

[22] Filed: Mar. 3, 1992

Related U.S. Application Data

[63] Continuation of Ser. No. 520,086, May 7, 1990, abandoned.

[30] Foreign Application Priority Data

May 11, 1989 [JP] Japan .................. 1-116034

[51] Int. Cl.$^5$ .......................... C08J 5/18; C08L 23/10
[52] U.S. Cl. .................. 428/220; 525/240; 524/528
[58] Field of Search .......... 525/240; 428/220

[56] References Cited

U.S. PATENT DOCUMENTS

| | | | |
|---|---|---|---|
| 4,720,427 | 1/1988 | Clauson et al. | 428/516 |
| 4,732,940 | 3/1988 | Yamaoka et al. | 525/240 |
| 4,742,106 | 5/1988 | Kamiya et al. | 524/528 |
| 4,748,206 | 5/1988 | Nowiga et al. | 525/88 |
| 4,764,404 | 8/1988 | Genski et al. | |
| 4,769,283 | 9/1988 | Sipinen et al. | 428/343 |
| 4,778,697 | 10/1988 | Genski | 428/35 |
| 4,812,526 | 3/1989 | Rifi | 525/240 |

FOREIGN PATENT DOCUMENTS

| | | | |
|---|---|---|---|
| 52-072744 | 6/1977 | Japan . | |
| 103478 | 8/1979 | Japan . | |
| 58-157839 | 9/1983 | Japan . | |
| 61-243842 | 10/1986 | Japan | 525/240 |
| 63-033449 | 2/1988 | Japan . | |

Primary Examiner—Carman J. Seccuro, Jr.
Attorney, Agent, or Firm—Dilworth & Barrese

[57] ABSTRACT

The present invention provides a polypropylene film having high transparency and heat-sealability and superior in the balance between stiffness (tensile modulus) and impact resistance which polypropylene film comprises a) 80-99.5% by weight of a propylene polymer and b) 0.5-20% by weight of an ethylene/α-olefin copolymer prepared by the copolymerization of ethylene and an α-olefin having a 3 to 12 carbon atoms, said ethylene/α-olefin copolymer satisfying the following conditions (i) to (iii):

(i) a density of 0.860 to 0.910 g/cm$^3$;
(ii) a maximum peak temperature of not lower than 100° C. as measured by differential scanning calorimetry (DSC); and
(iii) an insolubles content in boiling n-hexane of not lower than 10% by weight.

8 Claims, 1 Drawing Sheet

DSC MEASUREMENT OF ETHYLENE COPOLYMERS

1 : LLDPE
2 : ETHYLENE-α-OLEFIN COPOLYMER (USED IN THE PRESENT INVENTION)
3 : EPR

DSC MEASUREMENT OF ETHYLENE COPOLYMERS

1: LLDPE

2: ETHYLENE-α-OLEFIN COPOLYMER
(USED IN THE PRESENT INVENTION)

3: EPR

POLYPROPYLENE FILM

This is a continuation of copending application Ser. No. 07/520,086 filed on May 7, 1990, now abandoned.

BACKGROUND OF THE INVENTION

The present invention relates to a polypropylene film and more particularly to a polypropylene film having high transparency and heat-sealability and superior in the balance between stiffness (tensile modulus) and impact resistance.

Polypropylenes are superior in mechanical characteristics and also superior in transparency, resistance to heat and chemicals and processability, so polypropylene films have heretofore been used widely in the packaging field.

On the other hand, with the recent diversification of the life mode, the quality of diet have changed and the necessity of a long-period preservation of foods has been increasing to a greater extent. At the same time, the occasion of handling packaged foods at low temperatures has become more frequent. Under the circumstances, polypropylene film having the aforementioned characteristics is one of the most useful materials for packaging use. However, polypropylenes and especially a homopolymer of propylene are weak in impact resistance at low temperatures although they are superior in mechanical characteristics and transparency, and thus they are not satisfactory for the packaging use.

In order to remedy this drawback there have been proposed various methods such as the addition of rubber component to a polypropylene (Japanese Patent Publication No. 7088/1960), the addition of polyethylene thereto (Japanese Patent Publication No. 6975/1962), or the addition of a small amount of ethylene during the polymerization of propylene, allowing a random copolymerization of propylene and ethylene to take place (Japanese Patent Publication No. 11230/1968).

With such proposed methods, however, mechanical characteristics, especially tensile modulus, as well as transparency, are deteriorated although the impact resistance is improved, and so it has been difficult to obtain a fully satisfactory performance.

It is the object of the present invention to remedy the above-mentioned impact resistance without deteriorating mechanical characteristics and transparency.

SUMMARY OF THE INVENTION

Having made extensive studies for achieving the aforesaid object, the present inventors found out that by using a polypropylene composition comprising a polypropylene and a specific ethylene/α-olefin copolymer there can be obtained a film which retains high tensile modulus and transparency and has improved impact resistance.

More specifically, the present invention provides a polypropylene film comprising a) 80–99.5 wt % of a propylene polymer and b) 0.5–20 wt % of an ethylene/α-olefin copolymer prepared by the copolymerization of ethylene and an α-olefin having a 3 to 12 carbon atoms, the ethylene/α-olefin copolymer satisfying the following conditions (i) to (iii):
  (i) a density of 0.860 to 0.910 g/cm$^3$;
  (ii) a maximum peak temperature of not lower than 100° C. as measured by differential scanning calorimetry (DSC); and
  (iii) an insolubles content in boiling n-hexane of not lower than 10 wt %.

DETAILED DESCRIPTION OF THE INVENTION

Figure 1:
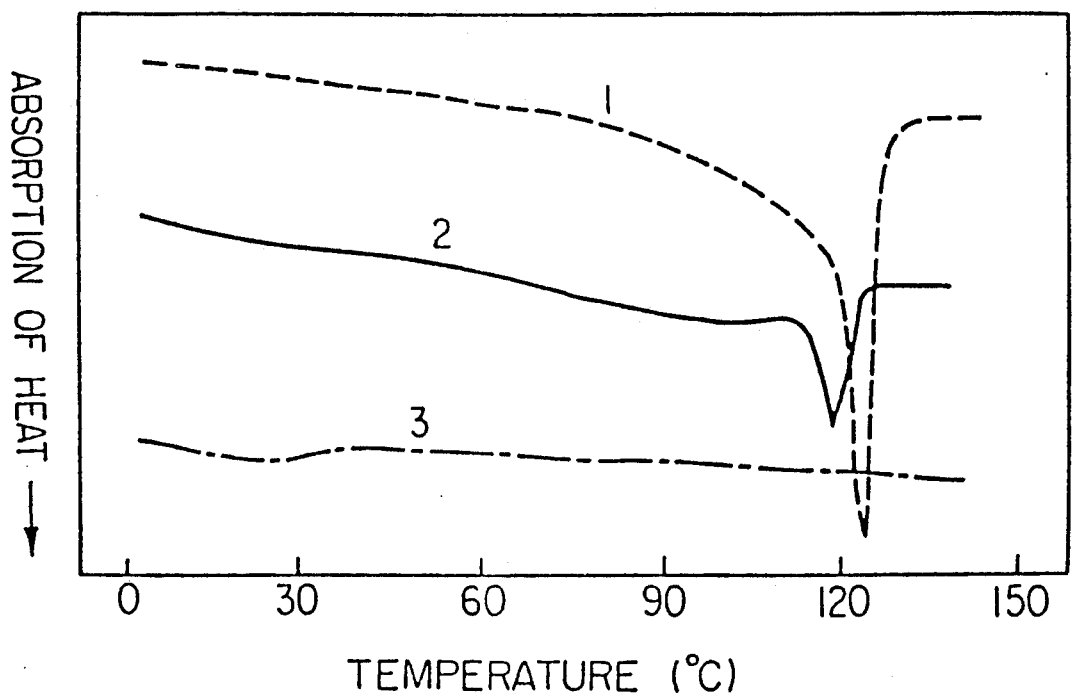
FIG. 1 is a graph showing DSC measurement of ethylene copolymers.

The contents of the present invention will be described in details hereinunder.

As the polypropylene polymer a) used in the present invention there may be used a homopolymer of propylene, or a block or random copolymer of propylene as a main component with another α-olefin. In point of mechanical strength and transparency, a homopolymer of propylene is preferred.

The melt flow rate (hereinafter referred to as "MFR") of the above propylene polymer is in the range of 0.1 to 30 g/10 min, preferably 1 to 20 g/10 min, more preferably 1 to 10 g/10 min. If the MFR thereof is smaller than 0.1 g/10 min, its fluidity in a molten state is poor, requiring an increased screw power in an extruder; besides, there will occur surface roughness of the obtained film, so such low MFR value is not desirable. An MRF value exceeding 30 g/10 min is not desirable, either, because it would cause deterioration in the mechanical strength of the obtained film.

The ethylene/α-olefin copolymer b) used in the present invention is a copolymer of ethylene and an α-olefin having 3 to 12 carbon atoms and it satisfies the foregoing conditions (i)–(iii). As examples of such α-olefin there are mentioned propylene, 1-butene, 4-methyl-1-pentene, 1-hexane, 1-octene, 1-decene and 1-dodecene. It is preferable that the α-olefin content of the ethylene/α-olefin copolymer be in the range of a 5 to 40 mol %.

The following description is provided about how to prepare the ethylene/α-olefin copolymer.

The catalyst system used comprises a solid catalyst component and an organoaluminum compound, the solid catalyst component containing at least magnesium and titanium. The solid catalyst component is obtained by supporting a titanium compound on an inorganic solid compound containing magnesium by a known method. Examples of magnesium-containing inorganic solid compounds include metallic magnesium, magnesium hydroxide, magnesium oxide and magnesium salts such as magnesium carbonate and magnesium chloride, as well as double salts, double oxides, carbonates, chlorides and hydroxides, which contain magnesium and an element selected from silicon, aluminum and calcium. Further, these magnesium-containing inorganic solid compounds after treatment or reaction with oxygen-containing compounds, sulfur-containing compounds, aromatic hydrocarbons or halogen-containing substances may be used.

As examples of the above oxygen-containing compounds are mentioned water, organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thio-ethers and the like, inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxy-halides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is an integer in the range $0<n<4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium.

As examples of trivalent titanium compounds are mentioned titanium trihalides obtained by reducing titanium tetrahalides such as titanium tetrachloride and titanium tetrobromide with hydrogen, aluminum, titanium or an organometallic compound of a Group I–III metal in the Periodic Table, as well as trivalent titanium compounds obtained by reducing tetravalent alkoxytitanium halides of the general formula $Ti(OR)_mX_{4-m}$ with an organometallic compound of a Group I–III metal in the Periodic Table in which formula R is an alkyl, aryl or aralkyl group having 1 to 20 carbon atoms, X is a halogen atom and m is an integer in the range $0<m<4$.

Among these titanium compounds tetravalent titanium compounds are particularly preferred.

As other examples of solid catalyst components are mentioned reaction products obtained by the reaction of organomagnesium compounds such as so-called Grignard compounds with titanium compounds.

As still other examples of solid catalyst components are mentioned solid products obtained by contacting inorganic oxides such as $SiO_2$ and $Al_2O_3$ with the solid catalyst components containing at least magnesium and titanium.

As preferred examples of the organoaluminum compound to be combined with the aforesaid solid catalyst component are mentioned those represented by the general formulae $R_3Al$, $R_2AlX$, $RAlX_2$, $R_2AlOR$, $RAl(OR)X$ and $R_3Al_2X_3$ wherein the Rs may be the same or different and each R is an alkyl, aryl or aralkyl group having 1 to 20 carbon atoms, X is a halogen atom; such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, and usually it is in the range of 0.1 to 1,000 mols per mol of the titanium compound.

The copolymerization reaction is carried out in the same manner as in the conventional olefin polymerization reaction using a Ziegler type catalyst. More particularly, the reaction is performed in a substantially oxygen- and water-free condition in vapor phase, or in liquid phase in the presence of an inert solvent or using monomer per se as solvent. Olefin polymerizing conditions involve temperatures in the range of 20° to 300° C., preferably 40° to 200° C., and pressures in the range from normal pressure to 70 kg/cm²G, preferably 2 to 60 kg/cm²G. The molecular weight can be adjusted to some extent by changing polymerization conditions such as polymerization temperature and catalyst component mol ratio, but the addition of hydrogen into the polymerization system is more effective for this purpose. Of course, two or more multi-stage polymerization reactions involving different polymerization conditions such as different hydrogen concent-rations and different polymerization temperatures can be carried out without any trouble.

It is necessary that the ethylene/α-olefin copolymer b) in the present invention thus produced exhibit the following properties:

(i) a density of 0.860 to 0.910 g/cm³, preferably 0.890 to 0.905 g/cm³;

(ii) a maximum peak temperature of not lower than 100° C., preferably not lower than 110° C., as measured by differential scanning calorimetry (DSC); and (iii) an insolubles content in boiling n-hexane of not lower than 10 wt %.

If the density referred to above exceeds 0.910 g/cm³, a film obtained by forming according to the present invention will not be greatly improved in its impact resistance. On the other hand, a density lower than 0.860 g/cm³ will result in deteriorated strength of the film or result in sticky surface, thus causing blocking.

If the maximum peak temperature as measured by DSC (hereinafter referred to as "Tm") is lower than 100° C. or if the insolubles content in boiling n-hexane (hereinafter referred to as "$C_6$ insolubles content") is lower than 10 wt %, a film formed according to the present invention will be deteriorated in strength or will have a sticky surface, which causes blocking.

The MFR of the ethylene/α-olefin copolymer is preferably in the range of 0.1 to 50 g/10 min, more preferably 1 to 20 g/10 min.

The ethylene/α-olefin copolymer b) has both a highly crystalline portion and an amorphous portion and so it is a special copolymer which possesses both the mechanical strength and resistance to heat and oil of conventional crystalline polyolefins and the rubbery elasticity and flexibility of amorphous polymers. By blending it with the propylene polymer a) there is easily obtained a composition which retains in an extremely well-balanced state a variety of properties required for a packing film. The present inventors found out this fact.

As ethylene/α-olefin copolymers of this sort available commercially heretofore there are a linear low-density polyethylene (LLDPE) and an ethylene-propylene copolymer rubber (EPR).

However, the ethylene/α-olefin copolymer used in the present invention is clearly distinguished from such conventional LLDPE and EPR. For example, FIG. 1 shows crystal melting behaviors of typical LLDPE, the ethylene/α-olefin copolymer used in the present invention and EPR as determined by DSC. As is seen from the results shown therein, the LLDPE has a fairly high crystallinity and is superior in heat resistance and mechanical strength to the ethylene/α-olefin copolymer used in the present invention, but is poor in flexibility and inferior in impact resistance.

On the other hand, the EPR, which is available commercially and prepared by using a solid catalyst containing vanadium as a main component, exhibits little crystallinity. Even if a crystalline portion is present, it is extremely small, and its Tm as measured by DSC is far lower than 100° C. Although the EPR is not deficient in flexi-bility and impact resistance, which deficiency is recognized in the above LLDPE, it is low in heat resistance and mecha-nical strength.

The following are the method for measuring Tm by DSC and the method for determining $C_6$ insolubles content in the present invention.

Measurement of Tm by DSC

About 5 mg of a specimen is weighed from a hot-pressed 100 μm thick film. Then, it is set on a differential scanning calorimeter. The temperature is raised to 170° C., at which temperature the specimen is held for 15 minutes. Thereafter, the specimen is cooled to 0° C. at a rate of 2.5° C./min. Next, from this state the temperature is raised to 170° C. at a rate of 10° C./min. The temperature at the vertex position of the maximum peak out of peaks which appeared during the heat-up period from °C. to 170° C. is regarded as Tm.

How to Determine $C_6$ insolubles content

A 200 μm thick sheet is formed using a hot press, from which are cut out three 20 mm×30 mm sheets. Using these sheets, extraction is made in boiling n-hexane for 5 hours by means of a double tube type Soxhlet extractor. Then, the insolubles are taken out and vacuum-dried (50° C., 7 hours), thereafter $C_6$ insolubles content is calculated in accordance with the following equation:

$$\text{C}_6 \text{ insolubles content (wt \%)} = \frac{\text{Sheet weight after extraction}}{\text{Sheet weight before extraction}} \times 100$$

Proportions of the components a) and b) are 80–99.5 wt % component a) and 0.5–20 wt % component b), preferably 95–99 wt % component a) and 1–5 wt % component b). An amount of component b) exceeding 20 wt % will cause deterioration in mechanical characteristics, particularly tensile strength and rigidity. On the other hand, if the amount of component b) is smaller than 0.5 wt %, it will be impossible to attain the object of improving the impact resistance.

For blending the components a) and b) there may be adopted any known technique. According to a typical example, the blending is performed by dry blending or melt mixing, using a tumbler or kneading machine such as a Henschel mixer and an extruder.

After the components a) and b) are mixed together in desired proportions, the resulting mixture is formed into film mainly by an inflation method or a T-die method. Particularly, the T-die method is preferred. The thickness of the film is preferably in the range of 10–150 μm.

Where required, fillers such as carbon black, calcium carbonate, silica and metallic fibers, and/or conventional additives such as anti-oxidant, flame retardant, coloring agent, antistatic agent, lubricant, ultraviolet absorber, dispersant and nucleating agent, may be added at the time of melt mixing of the components a) and b).

Since the polypropylene film of the present invention is formed using a composition of a propylene polymer and a specific ethylene/α-olefin copolymer incorporated therein, it is superior particularly in the balance between tensile modulus and impact resistance in addition to high transparency and heat-sealability. Therefore, the polypropylene film of the present invention is suitable for packaging, especially for automatic packaging bags, and also fully useful under low temperature conditions. For this reason it is utilized effectively as a packaging material for frozen foods.

WORKING EXAMPLES AND COMPARATIVE EXAMPLES

The present invention will be described below concretely in terms of working examples thereof and comparative examples, but the invention is not limited thereto.

The following polymers were used as components a) and b) in the working examples and comparative examples.

Component a):

(A) Polypropylene (1): (MFR 8.0 g/10 min, trade name: Nisseki Polypro F150J, a product of Nippon Petrochemical Co., Ltd.)

(B) Polypropylene (2): (MFR 7.0 g/10 min, trade name: Nisseki Polypro F450J, a product of Nippon Petrochemicals Co., Ltd.)

Component b):

(C) Ethylene/1-Butene Copolymer

An ethylene/1-butene copolymer was prepared by the copolymerization of ethylene and 1-butene, using a catalyst consisting of a solid catalyst component and triethylaluminum, the solid catalyst component having been obtained from substantially anhydrous magnesium chloride, 1,2-dichloroethane and titanium tetrachloride.

The ethylene/1-butene copolymer thus prepared had a 1-butene content of 10 mol %, a density of 0.905 g/cm$^3$, a Tm of 121° C., a $C_6$ insolubles content of 82 wt % and an MFR of 5.0 g/10 min.

(D) Ethylene/1-Butene Copolymer Rubber

An ethylene/1-butene copolymer rubber was prepared using a vanadyl trichloride-ethylaluminum sesquichloride catalyst. This copolymer rubber had a 1-butene content of 5 mol %, a density of 0.895 g/cm$^3$, a Tm of 81° C., a $C_6$ insolubles content of 1.5 wt % and an MFR of 3.5 g/10 min.

(E) Linear Low-density Polyethylene (Density 0.922 g/cm$^3$, MFR 2.0 g/10 min, trade name: Nisseki Linirex AF 3310, a product of Nippon Petrochemicals Co., Ltd.)

EXAMPLES 1–3, COMPARATIVE EXAMPLES 1–5

The polymer (A) as component a) and the polymer (C), (D), or (E) as component b) were dry-blended in predetermined proportions and the resultant blend was melt-extruded at 240° C. by a T-die method using an extruder having a cylinder bore of 50 mm and a screw length/diameter ratio of 22 to form a 30 μm thick film. In this way there were prepared like films in such compositions as shown in Table 1. Properties of the films are also set forth in the same table.

The properties of the films were measured by the following methods.

Haze

Measured according to ASTM D 1003.

Yield Strength, Tensile Strength at Break, Elongation at Break

Measured according to ASTM D 882.
Tensile Modulus

TABLE 1

| Item Example | Composition | | | | Haze (%) | Properties of Film | | | | | | | | Heat-Sealing temp. (°C.) |
|---|---|---|---|---|---|---|---|---|---|---|---|---|---|---|
| | Component a) | | Component b) | | | Yield Strength (kgf/cm²) | | Tensile Strength at Break (kgf/cm²) | | Elongation at Break (%) | | Tensile Modulus (kgf/cm²) | | Impact Strength (5° C.) (kgf · cm/mm thickness) |
| | kind | (wt %) | kind | (wt %) | | MD | TD | MD | TD | MD | MD | MD | TD | | |
| Ex. 1 | A | 99 | C | 1 | 1.5 | 255 | 245 | 680 | 420 | 620 | 750 | 7,800 | 8,500 | 8 | 143 |
| Ex. 2 | A | 97 | C | 3 | 1.5 | 260 | 250 | 690 | 420 | 650 | 750 | 7,750 | 8,380 | 11 | 143 |
| Ex. 3 | A | 90 | C | 10 | 1.6 | 250 | 230 | 590 | 350 | 600 | 700 | 7,310 | 7,720 | 11 | 140 |
| Comp. Ex. 1 | A | 100 | — | — | 1.4 | 250 | 240 | 670 | 430 | 610 | 760 | 7,830 | 8,510 | 4 | 144 |
| Comp. Ex. 2 | A | 99 | D | 1 | 1.5 | 250 | 240 | 680 | 410 | 620 | 740 | 7,650 | 8,220 | 7 | 143 |
| Comp. Ex. 3 | A | 97 | D | 3 | 1.6 | 250 | 240 | 690 | 390 | 640 | 730 | 7,300 | 7,810 | 10 | 142 |
| Comp. Ex. 4 | A | 90 | D | 10 | 1.7 | 250 | 220 | 590 | 350 | 610 | 690 | 6,690 | 7,150 | 13 | 140 |
| Comp. Ex. 5 | A | 97 | E | 3 | 1.7 | 250 | 250 | 680 | 420 | 650 | 730 | 7,820 | 8,480 | 5 | 144 |
| Ex. 4 | B | 99 | C | 3 | 3.3 | 180 | 180 | 510 | 370 | 740 | 790 | 3,710 | 3,720 | 134 | 124 |
| Comp. Ex. 6 | B | 100 | — | — | 3.2 | 180 | 180 | 450 | 410 | 640 | 680 | 3,940 | 3,980 | 48 | 125 |
| Comp. Ex. 7 | B | 99 | D | 3 | 3.2 | 180 | 180 | 500 | 360 | 700 | 760 | 3,700 | 3,700 | 110 | 125 |
| Comp. Ex. 8 | B | 97 | E | 3 | 3.9 | 180 | 183 | 490 | 380 | 700 | 770 | 3,910 | 3,930 | 63 | 125 |

A: Polypropylene (1) (Nisseki POLYPRO F 150J)
B: Polypropylene (2) (Nisseki POLYPRO F 450J)
C: Ethylene/1-butene copolymer
D: Ethylene/1-butene copolymer rubber
E: Linear low-density polyethylene (Nisseki LINIREX AF 3310)

Using an Instron tensile tester, each film was pulled under the conditions of a film width of 20 mm, a distance between grips of 250 mm and a speed of testing of 25 mm/min, and its tensile modulus was determined from a load corresponding to 1% deformation of the film.

Impact Strength

A ½ inch diameter ball was adopted as the impact point of a pendulum-type impact tester (a product of K. K. Toyo Seiki Seisaku-sho) and using this impact tester, each film was measured for impact strength at break at 5° C.

Heat-Sealing Temperature

From the films formed there were obtained 15 mm wide strips longitudinally parallel with the extrusion direction (machine direction: MD), and using two of these strips as one set, heat sealing was performed in a direction perpendicular to the MD (transverse direction: TD) under the conditions of a heating bar width of 5 mm, a sealing pressure of 2 kgf/cm² and a sealing time of 1 sec, to prepare a specimen. This specimen was peeled off at a speed of testing of 300 mm/min using an Instron tensile tester, and the temperature at which there was obtained a peel strength of 300 gf/15 mm-width was determined to be a heat-sealing temperature.

EXAMPLE 4, COMPARATIVE EXAMPLES 6-8

The polymer (B) as component a) and the polymer (C), (D) or (E) as component b) were dry-blended in predetermined proportions and the resulting blend was extruded at 210° C. by a water-cooling inflation method using an extruder having a cylinder bore of 50 mm and a screw length/diameter ratio of 24, and a 30 μm thick film was formed at a blow-up ratio of 1.5 and a water temperature of 25° C. In this way there were prepared like films in such compositions as shown in Table 1. Properties of the films are also set forth in the same table.

In all of the working Examples of the present invention, as is apparent from Table 1, there were obtained films superior in transparency, heat-sealability and also superior in tensile modulus and impact resistance. On the other hand, it is apparent that the films obtained in the comparative Examples are inferior in the balance between tensile modulus and impact resistance.

What is claimed is:

1. A polypropylene single layer film comprising a) 95-99.5% by weight of a propylene polymer and b) 0.5-5% by weight of an ethylene/α-olefin copolymer prepared by the copolymerization of ethylene and an α-olefin having a 3 to 12 carbon atoms, said ethylene/α-olefin copolymer satisfying the following conditions (i) to (iii):
   (i) a density of 0.860 to 0.910 g/cm³;
   (ii) a maximum peak temperature of not lower than 100° C. as measured by differential scanning calorimetry (DSC); and
   (iii) an insolubles content in boiling n-hexane of not lower than 10% by weight.

2. A polypropylene film as set forth in claim 1, wherein said propylene polymer is homopolypropylene.

3. A polypropylene film as set forth in claim 1, wherein said α-olefin is propylene, 1-butene, 4-methyl-1-pentene, 1-hexene, 1-octene, 1-decene, or 1-dodecene.

4. A polypropylene film as set forth in claim 1, wherein said α-olefin is 1-butene.

5. A packaging film comprising polypropylene single layer film having a thickness of about 150 microns or less comprising a) 95-99% by weight of a propylene polymer and b) 1-5% by weight of an ethylene/α-olefin copolymer prepared by the copolymerization of ethylene and an α-olefin having a 3 to 12 carbon atoms, said ethylene/α-olefin copolymer satisfying the following conditions (i) to (iii):
   (i) a density of 0.860 to 0.910 g/cm³;
   (ii) a maximum peak temperature of not lower than 100° C. as measured by differential scanning calorimetry (DSC); and
   (iii) an insolubles content in boiling n-hexane of not lower than 10% by weight.

6. A polypropylene film as set forth in claim 5, wherein said propylene polymer is homopolypropylene.

7. A polypropylene film as set forth in claim 5, wherein said α-olefin is propylene, 1-butene, 4-methyl-1-pentene, 1-hexene, 1-octene, 1-decene, or 1-dodecene.

8. A polypropylene film as set forth in claim 5, wherein said α-olefin is 1-butene.

* * * * *